United States Patent
Urata et al.

(10) Patent No.: US 12,088,782 B2
(45) Date of Patent: *Sep. 10, 2024

(54) VIDEO QUALITY ESTIMATION APPARATUS, VIDEO QUALITY ESTIMATION METHOD AND PROGRAM

(71) Applicant: Nippon Telegraph and Telephone Corporation, Tokyo (JP)

(72) Inventors: Yuichiro Urata, Musashino (JP); Masanori Koike, Musashino (JP); Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 17/800,645

(22) PCT Filed: Feb. 25, 2020

(86) PCT No.: PCT/JP2020/007458
§ 371 (c)(1),
(2) Date: Aug. 18, 2022

(87) PCT Pub. No.: WO2021/171363
PCT Pub. Date: Sep. 2, 2021

(65) Prior Publication Data
US 2023/0099593 A1    Mar. 30, 2023

(51) Int. Cl.
*H04N 17/00* (2006.01)
*G11B 27/36* (2006.01)
(Continued)

(52) U.S. Cl.
CPC ............. *H04N 17/00* (2013.01); *G11B 27/36* (2013.01); *H04N 21/4394* (2013.01); *H04N 21/44008* (2013.01); *H04N 21/816* (2013.01)

(58) Field of Classification Search
CPC ............... H04N 17/00; H04N 21/4394; H04N 21/44008; H04N 21/816; G11B 27/36
See application file for complete search history.

(56) References Cited

U.S. PATENT DOCUMENTS

2016/0105728 A1*  4/2016  Schmidmer ...... H04N 21/64723
                                                725/110
2017/0085872 A1*  3/2017  Perron ................. H04N 19/117
(Continued)

OTHER PUBLICATIONS

[No Author Listed], "Parametric bitstream-based quality assessment of progressive download and adaptive audio visual streaming services over reliable transport," Recommendation ITU-T p. 1203, Oct. 2017.

(Continued)

*Primary Examiner* — Sunghyoun Park
(74) *Attorney, Agent, or Firm* — Fish & Richardson P.C.

(57) ABSTRACT

A video quality estimation device for estimating quality to be experienced by a user during viewing of a video includes a video quality estimation unit that calculates a video quality estimation value based on a parameter related to video quality of a high image quality region in the video, a parameter related to video quality of a low image quality region in the video, and a parameter related to a time for switching from a low image quality display state to a high image quality display state.

12 Claims, 4 Drawing Sheets

(51) Int. Cl.
   *H04N 21/439* (2011.01)
   *H04N 21/44* (2011.01)
   *H04N 21/81* (2011.01)

(56) References Cited

U.S. PATENT DOCUMENTS

2017/0237987 A1* 8/2017 Seigneurbieux ............................ H04N 21/23655
                                                                    375/240.02
2019/0045222 A1* 2/2019 Yip ........................ H04N 19/31
2019/0310472 A1* 10/2019 Schilt ...................... G06F 3/015

OTHER PUBLICATIONS

Ochi et al., "Live streaming system for omnidirectional video," IEEE Virtual Reality Conference 2015, Mar. 23, 2015.
Urata et al., "An applicability of ITU-T Recommendation P.1203 model to VR video streaming," IEICE Technical Report, 2019, 119(125):79-83, 11 pages (with English Translation).

* cited by examiner

| ID | Description | Values | Frequency |
|---|---|---|---|
| 12 | Target video bit-rate | Bit-rate in kbit/s | Per media segment |
| 13 | Video frame-rate | Frame rate in frames per second | Per media segment |
| 14 | Segment duration | Duration in seconds | Per media segment |
| 15 | Video encoding resolution | Number of pixels (WxH) in transmitted video | Per media segment |
| 16 | Video codec and profile | One of: H264-baseline, H264-high, H264-main | Per media segment |
| 17 | Video frame number | Integer, starting at 1, denoting frame sequence number in encoding order | Per video frame |
| 18 | Video frame duration | Duration of the frame in seconds | Per video frame |
| 19 | Frame presentation timestamp | The frame presentation timestamp | Per video frame |
| 20 | Frame decoding timestamp | The frame decoding timestamp | Per video frame |
| 21 | Video frame size | The size of the encoded video frame in bytes | Per video frame |

VIDEO QUALITY ESTIMATION APPARATUS, VIDEO QUALITY ESTIMATION METHOD AND PROGRAM

CROSS-REFERENCE TO RELATED APPLICATIONS

This application is a National Stage application under 35 U.S.C. § 371 of International Application No. PCT/JP2020/007458, having an International Filing Date of Feb. 25, 2020. The disclosure of the prior application is considered part of the disclosure of this application, and is incorporated by reference in its entirety into this application.

TECHNICAL FIELD

The present disclosure relates to a technique of evaluating the quality of a virtual reality (VR) video.

BACKGROUND ART

In recent years, with the development of VR technology, the number of VR video streaming services and contents which allow users to look around 360 degrees has been increasing, and the opportunities for users to view VR videos using smartphones, tablet terminals, PCs, HMDs, and the like have been also increasing.

In the provision of services through a best-effort type network, the quality of services changes greatly depending on a time slot or the like, and thus the visualization of the quality of services is important. Thus, a quality estimation technique for monitoring the quality of video streaming, Web browsing, voice calling, and the like has been established.

On the other hand, in recent years, VR video streaming services that allow 360-degree viewing in all directions have become widespread with high performance of cameras, high definition and miniaturization of displays, the progress of video processing techniques, and the like. However, quality estimation techniques for VR video streaming have not been established yet.

VR video streaming requires a high bit rate in order to stream a 360-degree video with high resolution. Thus, tile-based streaming is becoming mainstream, in which a region displayed on a display in a user's viewing direction is streamed at a high bit rate without encoding and streaming an entire video with uniform image quality as in 2D video streaming services and other videos not displayed on the display are streamed at a low bit rate or not streamed to thereby suppress streaming costs.

NPL 1 proposes an encoding scheme of dividing an entire video into tiles, subjecting each tile to encoding at a high bit rate (high image quality tiling), and lowering the resolution of the entire video to subject the video to encoding at a low bit rate (low image quality tiling). In this scheme, high image quality tiles in a user's viewing direction and low image quality tiles including the entire video are streamed.

Adaptive bit rate video streaming, including MPEG-DASH and the like, is also used for tile-based streaming. In adaptive bit rate video streaming, streaming is performed while bit rate levels are switched in order to avoid playback stalling caused by a decrease in throughput or a buffer exhaustion at a receiving terminal insofar as possible.

As described above, in tile-based VR video streaming, high image quality tiles need to be newly downloaded with a change in a user's viewing region, and thus low image quality tiles are displayed during the downloading. In addition, the exhaustion of throughput or buffers causes a variation in bit rate to be selected or playback stalling. In order to monitor the quality of VR video streaming in this way, a quality estimation technique that takes into account a deterioration in quality associated with switching between high image quality and low image quality, a deterioration in image quality caused by a variation in bit rate, and playback stalling is required.

ITU-T Recommendation P.1203 (NPL 2) has been standardized as a quality estimation technique that takes into account a variation in bit rate and playback stalling to achieve quality monitoring.

However, in a method of estimating quality of a 2D video, including NPL 2, a variation in quality associated with a change in a viewing region is not taken into account. In a 2D video, although there is a variation in quality associated with a variation in band, the number of video qualities at a time of viewing is one, whereas in a tile-based VR video, changing the viewing direction causes a possibility that not only a high image quality region but also a low image quality region are viewed, which results in the need for considering both video qualities.

NPL 3 is an extension of NPL 2 and examines quality estimation for a VR video, particularly, quality estimation for a tile-based VR video. NPL 3 estimates experience quality during a user's viewing by using quality estimation values or the amounts of quality deterioration of high image quality tiles and low image quality tiles in consideration of a variation in quality associated with a change in a viewing region.

CITATION LIST

Non Patent Literature

NPL 1: D. Ochi, Y. Kunita, A. Kameda, A. Kojima, S. Iwaki, "Live streaming system for omnidirectional video," Proc. of IEEE Virtual Reality (VR), 2015

NPL 2: Parametric bitstream-based quality assessment of progressive download and adaptive audiovisual streaming services over reliable transport, Recommendation ITU-T P.1203, 2017

NPL 3: Yuichiro Urata, Masanori Koike, Kazuhisa Yamagishi, "An applicability of ITU-T Recommendation P.1203 model to VR video streaming," IEICE Technical Report, vol. 119, no. 125, CQ2019-52, pp. 79-83, July 2019

SUMMARY OF THE INVENTION

Technical Problem

In a tile-based VR video, not only a high image quality region but also a low image quality region is viewed by changing the viewing direction, and it takes time (hereinafter, switching delay) to switch from low image quality to high image quality in the changed direction of viewing. The switching delay depends on the buffer of a video player or the chunk size of a video.

However, the quality estimation method of NPL 3 is based on the assumption that the switching delay is constant, and the quality estimation values of high image quality tiles and low image quality tiles are weighted at a constant rate and summed. The accuracy of quality estimation is reduced when a switching delay is different from the assumed switching delay.

The present disclosure has been contrived in view of the above points, and an object thereof is to provide a technique that makes it possible to estimate quality to be experienced by a user during viewing of a VR video streamed adaptively in a tile-based manner in consideration of a switching delay associated with a change in a viewing region.

Means for Solving the Problem

According to the disclosed technique, there is provided a video quality estimation device for estimating quality to be experienced by a user during viewing of a video, the device including: a video quality estimation unit configured to calculate a video quality estimation value based on a parameter related to video quality of a high image quality region in the video, a parameter related to video quality of a low image quality region in the video, and a parameter related to a time for switching from a low image quality display state to a high image quality display state.

Effects of the Invention

According to the disclosed technique, there is provided a technique that makes it possible to estimate quality to be experienced by a user during viewing of a VR video streamed adaptively in a tile-based manner in consideration of a switching delay associated with a change in a viewing region.

DESCRIPTION OF EMBODIMENTS

Hereinafter, embodiments of the present disclosure will be described with reference to the accompanying drawings. The embodiments to be described below are examples, and embodiments to which the present disclosure is applied are not limited to the following embodiments. The description of the following embodiments is intended for a VR video, but the present disclosure can also be applied to a video having a high image quality region and a low image quality region, which is not a VR video.

In the following embodiments, a VR video quality estimation device will be described that estimates a VR video quality value (video quality value) to be experienced by a user during viewing of a VR video that allows the user to look around 360 degrees in a state where the user wears a head mounted display (HMD) or the like and can change the direction of the line of sight by actions such as turning his/her head or moving his/her body, or in a state where the user can change the viewing direction by operating a mouse or the like on a stationary type display of the related art.

Hereinafter, a first embodiment and a second embodiment will be described. In the first embodiment and the second embodiment, a VR video is tile-based and undergoes adaptive bit rate streaming. In addition, a high image quality region to be described below is, for example, a high image quality tile, and a low image quality region is, for example, a low image quality tile. In addition, a method of acquiring parameters which are input to a VR video quality estimation device 1 is not limited to specific methods. For example, parameters can be acquired from a video streaming server. In addition, a "video" which a user views is also assumed to include audio.

First Embodiment

Device Configuration

Figure 1:
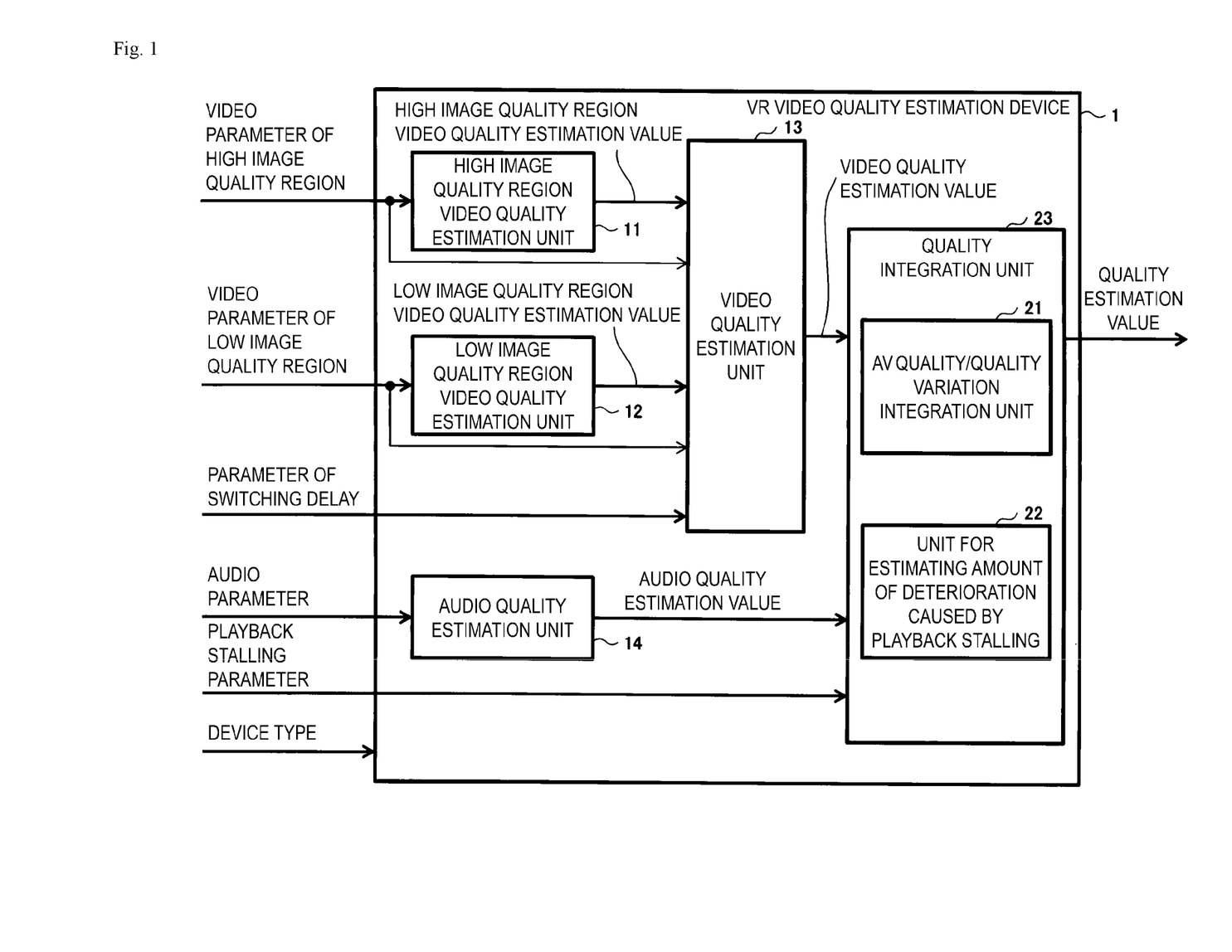
FIG. 1 is a configuration diagram of a VR video quality estimation device according to an embodiment of the present disclosure.

FIG. 1 illustrates a configuration example of the VR video quality estimation device 1 according to the first embodiment. As illustrated in FIG. 1, the VR video quality estimation device 1 includes a high image quality region video quality estimation unit 11, a low image quality region video quality estimation unit 12, a video quality estimation unit 13, an audio quality estimation unit 14, and a quality integration unit 23. The quality integration unit 23 includes an audio visual (AV) quality/quality variation integration unit 21 and a unit for estimating an amount of deterioration caused by playback stalling 22 (hereinafter, referred to as a deterioration amount estimation unit 22). Meanwhile, the VR video quality estimation device 1 may be referred to as a video quality estimation device 1. In addition, the VR video quality estimation device 1 does not need to include the audio quality estimation unit 14 or the quality integration unit 23. In that case, the VR video quality estimation device 1 outputs a video quality estimation value calculated by the video quality estimation unit 13.

Figure 2:
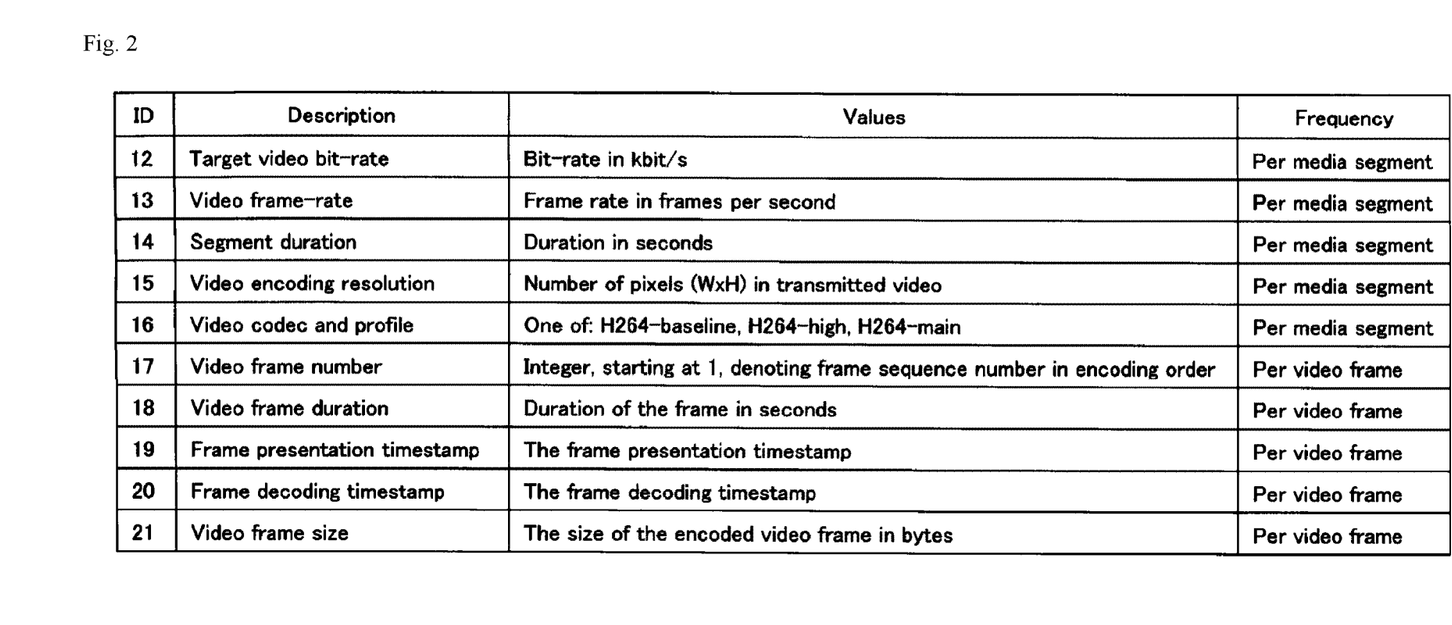
FIG. 2 is a diagram illustrating an example of input parameters to a high image quality region video quality estimation unit 11 according to the embodiment of the present disclosure.

The high image quality region video quality estimation unit 11 uses video parameters of the high image quality region as input to calculate a high image quality region video quality estimation value for viewing of about several seconds to several tens of seconds. FIG. 2 illustrates an example of the video parameters of the high image quality region. As illustrated in FIG. 2, a bit rate, a frame rate, resolution, and the like are used as the input parameters.

The high image quality region video quality estimation unit 11 calculates a high image quality region video quality estimation value using, for example, the following equations.

$O.22_H = MOSq$ $MOSq = q_1 + q_2 \cdot \exp(q_3 \cdot \text{quant})$ $\text{quant} = a_1 + a_2 \cdot \ln(a_3 + \ln(br_H) + \ln(br_H \cdot bpp_H))$ $$bpp_H = \frac{br_H}{res_H \cdot fr} \qquad \text{[Math. 1]}$$

Here, $O.22_H$ indicates a high image quality region video quality estimation value, brit indicates a bit rate, $res_H$ indicates resolution, fr indicates a frame rate, and $q_1$ to $q_3$ and $a_1$ to $a_3$ are constants determined in advance. As for quant, a predetermined quantization parameter QP may be used instead of calculating the value from brit and $bpp_H$ as described above.

Meanwhile, regarding the "constants determined in advance" expressed in the present specification, for example, an optimum value may be obtained through experiments, or in a case where a value specified in ITU-T Recommendation P.1203 can be applied, such a value may be used.

The high image quality region video quality estimation unit 11 may calculate the high image quality region video quality estimation value as follows using MOSq described above.

$$O.22_H = MOSfromR(100-D_H)$$

$$D_H = \max(\min(D_q+D_u+D_t, 100), 0)$$

$$D_q = \max(\min(100-RfromMOS(MOSq), 100), 0)$$

$$D_u = \max(\min(u_1 \cdot \log_{10}(u_2 \cdot (scaleFactor-1)+1), 100), 0)$$

$$scaleFactor = \max\left(\frac{disRes}{codRes}, 1\right) \quad \text{[Math. 2]}$$

$$D_t = \begin{cases} \max(\min(D_{t1} - D_{t2} - D_{t3}, 100), 0), & fr < 24 \\ 0, & fr \geq 24 \end{cases}$$

$$D_{t1} = \frac{100 \cdot (t_1 - t_2 \cdot fr)}{t_3 + fr}$$

$$D_{t2} = \frac{Dq \cdot (t_1 - t_2 \cdot fr)}{t_3 + fr}$$

$$D_{t3} = \frac{Du \cdot (t_1 - t_2 \cdot fr)}{t_3 + fr}$$

Here, $D_H$ indicates the amount of quality deterioration caused by the high image quality region. In addition, MOSfromR and RfromMOS are functions of converting between a user experience quality MOS and a psychological value R, disRes is display resolution, codRes is encoding resolution, and $u_1$, $u_2$, and $t_1$ to $t_3$ are constants determined in advance.

In addition, the high image quality region video quality estimation unit 11 may calculate the high image quality region video quality estimation value as follows.

$$O.22_H = VQ$$

$$VQ = X + \frac{1 - X}{1 + \left(\frac{br_H}{Y}\right)^{v_1}} \quad \text{[Math. 3]}$$

$$X = \frac{4 \cdot (1 - \exp(-v_3 \cdot fr)) \cdot res_H}{v_2 + res_H} + 1$$

$$Y = \frac{v_4 \cdot res_H + v_6 \cdot \log_{10}(v_7 \cdot fr + 1)}{1 - \exp(-v_5 \cdot res_H)}$$

Here, $br_H$, $res_H$, and fr indicate a bit rate, resolution, and a frame rate, respectively, and $v_1$ to $v_7$ are constants determined in advance. By using the same X and Y as X and Y in the above equations, the high image quality region video quality estimation value may be calculated as follows using a quantization parameter $QP_H$ instead of $br_H$.

$$VQ = X + \frac{1 - X}{1 + \left(\frac{QP_H}{Y}\right)^{v_1}} \quad \text{[Math. 4]}$$

Similarly to the high image quality region video quality estimation unit 11, the low image quality region video quality estimation unit 12 also uses video parameters of the low image quality region as input to calculate a low image quality region video quality estimation value $O.22_L$. The low image quality region video quality estimation value $O.22_L$ is also a quality estimation value for viewing of about several seconds to several tens of seconds.

Meanwhile, each constant when the low image quality region video quality estimation value $O.22_L$ is calculated may be equal to or different from each constant when $O.22_H$ is calculated by the high image quality region video quality estimation unit 11.

The video quality estimation unit 13 calculates a video quality estimation value O.22 based on the high image quality region video quality estimation value O.22H calculated by the high image quality region video quality estimation unit 11, the low image quality region video quality estimation value $O.22_L$ calculated by the low image quality region video quality estimation unit 12, and a parameter (delay to be described later) indicating a switching delay for switch from a low image quality display state to a high image quality display state. The video quality estimation value O.22 is also a quality estimation value for viewing of about several seconds to several tens of seconds. The video quality estimation unit 13 calculates the video quality estimation value using, for example, the following calculation equation.

$$O.22 = \omega \cdot O.22_H + (1-\omega) \cdot O.22_L$$

$$\omega = d_1 \cdot delay^{-d_2} + d_3 \cdot S_L^{-d_4}, \quad S_L = \frac{res - res_H}{res} \quad \text{[Math. 5]}$$

In the above equation, delay is the number of seconds of the switching delay, $res_H$ is the resolution of the high image quality region, res is the resolution of the entire video, and $d_1$ to $d_4$ are coefficients determined in advance. In addition, $\omega$ is a value indicating the degree of contribution of the quality of the high image quality region and the quality of the low image quality region to the total quality. Meanwhile, $S_L$ is an area occupied by the low image quality tile (low image quality region) in the entire image. In a case where the low image quality tile is not displayed, $S_L$ is zero. Especially when $d_3$ is equal to zero, $\omega$ can also be calculated without considering the influence of resolution. In addition, $\omega$ may be calculated in the form of a product as follows using the same variables and coefficients.

$$\omega = d_1 \cdot delay^{-d_2} \cdot d_3 \cdot S_L^{-d_4} \quad \text{[Math. 6]}$$

For the purpose of description, assuming that $d_1$ to $d_4$ are all set to 1, in any of the above equations of $\omega$, as the delay decreases and as the resolution of the high image quality region increases, $\omega$ becomes larger, and the contribution of the video quality of the high image quality region to the entire video becomes larger.

The video quality estimation unit 13 may calculate the video quality estimation value O.22 as follows without using $\omega$.

$$0.22 = \frac{0.22_H - 0.22_L}{1 + (d_5 \cdot delay + d_6)^{d_7} \cdot (d_8 \cdot S_L + d_9)^{d_{10}}} + 0.22_L \quad \text{[Math. 7]}$$

Here, $d_5$ to $d_{10}$ are coefficients determined in advance.

The audio quality estimation unit 14 uses audio parameters as input to calculate an audio quality estimation value for viewing of about several seconds to several tens of seconds. The audio quality estimation value can be calculated using the following equation.

$$O.21 = a_{1A} \cdot \exp(a_{2A} \cdot br_A) + a_{3A}$$

Here, O.21 indicates an audio quality estimation value, $br_A$ indicates a bit rate of audio, and $a_{1A}$ to $a_{3A}$ are constants determined in advance. In addition, the audio quality estimation unit 14 may calculate the audio quality estimation value using the following equation.

$$O.21 = a_{4A} + \frac{1 - a_{4A}}{1 + \left(\frac{br_A}{a_{5A}}\right)^{a_{6A}}} \quad [\text{Math. 8}]$$

In the above equation, $a_{4A}$ to $a_{6A}$ are constants determined in advance.

The quality integration unit 23 including the AV quality/quality variation integration unit 21 and the deterioration amount estimation unit 22 calculate the quality estimation value by using the video quality estimation value, the audio quality estimation value, a playback stalling parameter, and a device type as input.

The AV quality/quality variation integration unit 21 calculates a short-time AV quality estimation value O.34 for viewing of about several seconds to several tens of seconds from the video quality estimation value and the audio quality estimation value, and calculates a long-time AV quality estimation value O.35 for viewing of about several minutes in consideration of a variation in quality associated with the time variation of a band. Meanwhile, in the present specification, about several seconds to several tens of seconds are referred to as "short-time," and about several minutes are referred to as "long-time."

The AV quality/quality variation integration unit 21 can calculate O.34 using, for example, the following equation.

$$O.34_t = \max(\min(av_1 + av_2 \cdot O.21_t + av_3 \cdot O.22_t + av_4 \cdot O.21_t \cdot O.22_t, 5), 1)$$

Here, $O.34_t$ indicates an AV quality estimation value at a time t, $O.21_t$ indicates an audio quality estimation value at the time t, $O.22_t$ indicates a video quality estimation value at the time t, and $av_1$ to $av_4$ are constants determined in advance.

In addition, the AV quality/quality variation integration unit 21 can calculate O.35 which is an AV quality estimation value for a media session using the following equations.

$$O.35 = O.35_{baseline} - \text{negBias} - \text{oscComp} - \text{adaptComp}$$

$$O.35_{baseline} = \frac{\sum_t w_1(t) \cdot w_2(t) \cdot O.34_t}{\sum_t w_1(t) \cdot w_2(t)} \quad [\text{Math. 9}]$$

$$w_1(t) = t_1 + t_2 \cdot \exp\left(\frac{t-1}{T \cdot t_3}\right)$$

Here, O.35 indicates an AV quality estimation value, $O.34_t$ indicates an AV quality estimation value at the time t, and T indicates the target time length of the AV quality estimation value O.35. In addition, $t_1$ to $t_5$ are constants determined in advance. In addition, negBias, oscComp, and adaptComp are variables indicating the influence of the width and frequency of a variation in quality. In addition, negBias, oscComp, and adaptComp may be calculated using a method specified in ITU-T Recommendation P.1203, or, with the calculation omitted, O.35 may be equal to $O.35_{baseline}$.

The deterioration amount estimation unit 22 calculates an amount of deterioration SI caused by playback stalling from the playback stalling parameter. The amount of deterioration SI caused by playback stalling can be calculated using, for example, the following equation.

$$SI = \exp\left(-\frac{numStalls}{s_1}\right) \cdot \exp\left(-\frac{totalStallLen}{T \cdot s_2}\right) \cdot \exp\left(-\frac{avgStallInterval}{T \cdot s_3}\right) \quad [\text{Math. 10}]$$

Here, numStalls indicates the number of times of playback stalling, totalStallLen indicates a total of playback stalling times, avgStallInterval indicates an average of playback stalling occurrence intervals, and T indicates the target time length of the AV quality estimation value (and SI). In addition, $s_1$ to $s_3$ are constants determined in advance.

The quality integration unit 23 calculates a quality estimation value O.46 from the AV quality estimation value O.35 and the amount of deterioration SI caused by playback stalling. The quality estimation value can be calculated using, for example, the following equations.

$$O.46 = 0.02833052 + 0.98117059 \cdot O.46_{temp}$$

$$O.46_{temp} = 0.75 \cdot (1 + (O.35 - 1) \cdot SI) + 0.25 \cdot \text{RFPrediction}$$

Here, RFPrediction is a quality estimation value calculated by Random Forest. The calculation of Random Forest may be omitted, and the quality estimation value O.46 may be calculated as follows.

$$O.46 = 1 + (O.35 - 1) \cdot SI$$

Hardware Configuration Example

The VR video quality estimation device 1 may be achieved by hardware using, for example, a logic circuit that implements the function of each unit illustrated in FIG. 1, or may be achieved by causing a general-purpose computer to execute a program describing processing details described in the first and second embodiments. Meanwhile, this "computer" may be a virtual machine. In a case where a virtual machine is used, "hardware" to be described here is virtual hardware.

In a case where a computer is used, the VR video quality estimation device 1 can be achieved by executing a program corresponding to processing executed by the VR video quality estimation device 1 using hardware resources such as a CPU and a memory built into the computer. The above program can be stored or distributed with the program recorded on a computer readable recording medium (such as a portable memory). In addition, the above program can also be provided through a network such as the Internet or e-mail.

Figure 3:
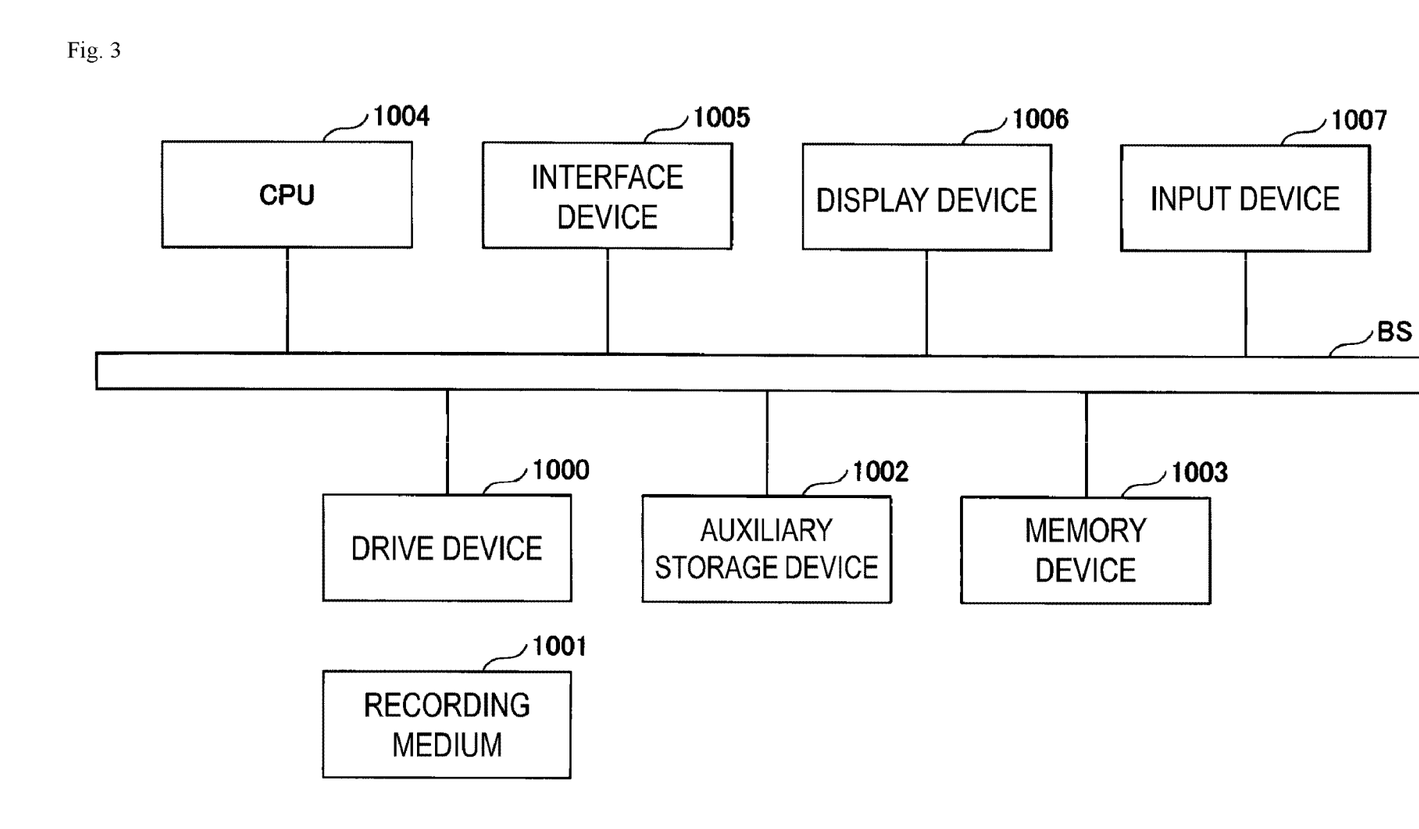
FIG. 3 is a diagram illustrating a hardware configuration example of the VR video quality estimation device according to the embodiment of the present disclosure.

FIG. 3 is a diagram illustrating a hardware configuration example of the above computer. The computer of FIG. 3 includes a drive device 1000, an auxiliary storage device 1002, a memory device 1003, a CPU 1004, an interface device 1005, a display device 1006, an input device 1007, and the like which are connected to each other through a bus B.

A program for implementing processing in the computer is provided by means of a recording medium 1001 such as a CD-ROM or a memory card. When the recording medium 1001 having a program stored therein is set in the drive device 1000, the program is installed from the recording medium 1001 through the drive device 1000 to the auxiliary storage device 1002. However, the program does not necessarily have to be installed from the recording medium 1001, and may be downloaded from another computer through a network. The auxiliary storage device 1002 stores the installed program, and stores necessary files, data, and the like.

In response to an activation instruction of the program, the memory device 1003 reads out the program from the auxiliary storage device 1002 and stores the program. The CPU 1004 implements the function relevant to the VR video quality estimation device 1 in accordance with the program stored in the memory device 1003. The interface device 1005 is used as an interface for connection to a network. The display device 1006 displays a graphical user interface (GUI) or the like based on the program. The input device 1007 includes a keyboard, a mouse, a button, a touch panel, and the like, and is used for inputting various operation instructions.

Processing Procedure of VR Video Quality Estimation Device 1

Figure 4:
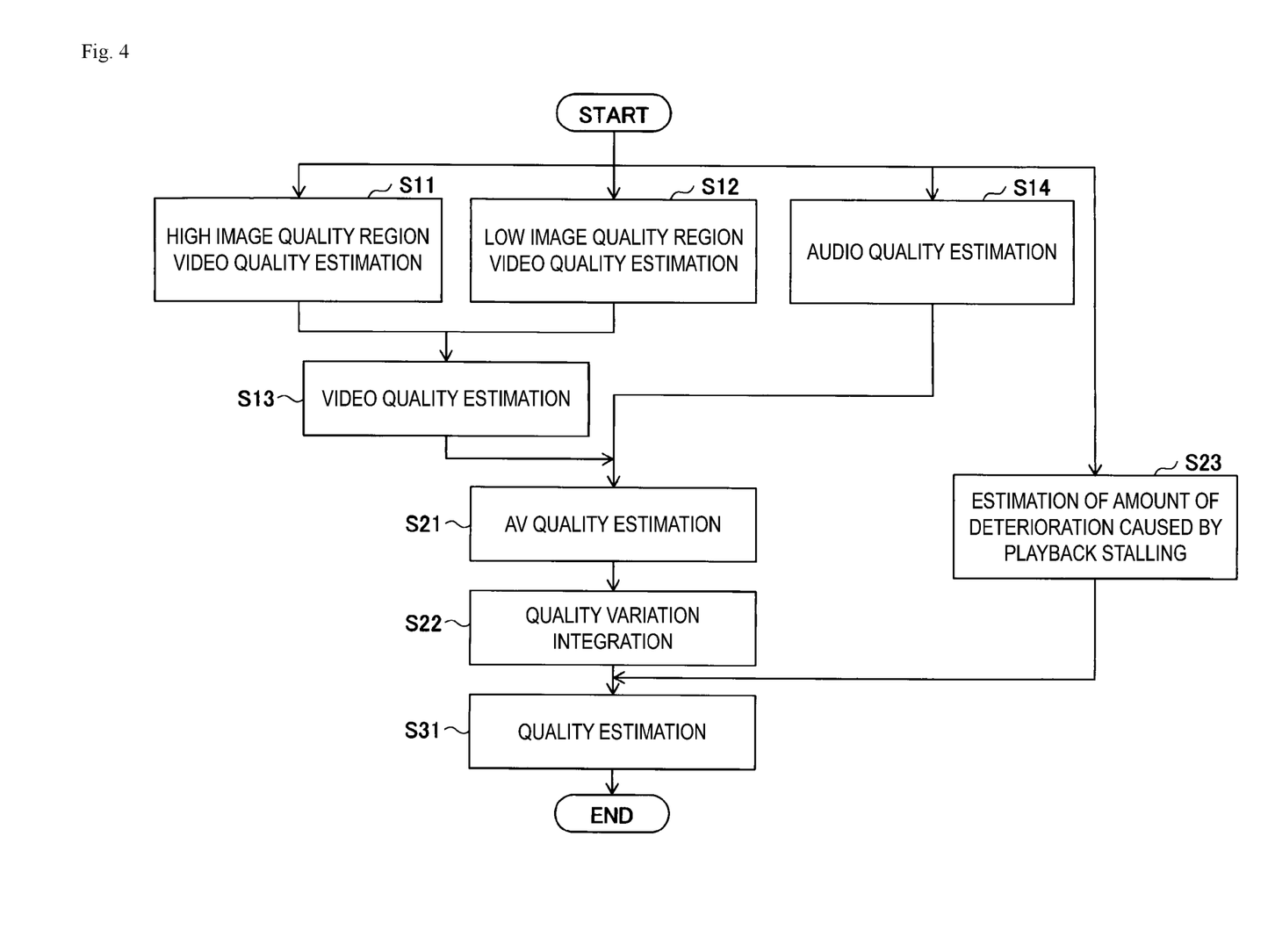
FIG. 4 is a flowchart of a video quality estimation method executed by the VR video quality estimation device according to the embodiment of the present disclosure.

Hereinafter, a processing procedure executed by the VR video quality estimation device 1 will be described. FIG. 4 is a flowchart illustrating an example of a processing procedure executed by the VR video quality estimation device 1.

In S11, the high image quality region video quality estimation unit 11 calculates the high image quality region video quality estimation value based on video parameters of the high image quality region. In S12, the low image quality region video quality estimation unit 12 calculates the low image quality region video quality estimation value based on video parameters of the low image quality region.

In S13, the video quality estimation unit 13 calculates the video quality estimation value (for example, O.22) based on the high image quality region video quality estimation value, the low image quality region video quality estimation value, and the parameters related to a time for switching from the low image quality display state to the high image quality display state. In S14, the audio quality estimation unit 14 calculates the audio quality estimation value (for example, O.21).

In S21, the AV quality/quality variation integration unit 21 calculates the short-time AV quality estimation value (for example, O.34) based on the video quality estimation value and the audio quality estimation value. In S22, the AV quality/quality variation integration unit 21 calculates the AV quality estimation value (for example, O.35) based on the short-time AV quality estimation value.

In S23, the deterioration amount estimation unit 22 calculates the amount of deterioration caused by playback stalling (for example, SI). In S31, the quality integration unit 23 calculates and outputs the quality estimation value (for example, O.46) based on the AV quality estimation value and the amount of deterioration caused by playback stalling, and terminates the processing.

Second Embodiment

Next, a second embodiment will be described. Hereinafter, differences between the second embodiment and the first embodiment will be described.

The second embodiment is different from the first embodiment in that each of the high image quality region video quality estimation unit 11 and the low image quality region video quality estimation unit 12 outputs the amount of quality deterioration, and that the video quality estimation unit 13 calculates the video quality estimation value based on these amounts of quality deterioration.

For example, the high image quality region video quality estimation unit 11 and the low image quality region video quality estimation unit 12 output $D_H$ and $D_L$ using the equations described in the first embodiment.

The video quality estimation unit 13 can calculate the video quality estimation value (O.22) using the following equations.

$$O.22 = MOSfromR(100 - \max(\min(D_{HL}, 100), 0))$$

$$D_{HL} = \omega \cdot D_H + (1-\omega) \cdot D_L$$

$$\omega = d_1 \cdot delay^{-d_2} + d_3 \cdot S_L^{-d_4}, \quad S_L = \frac{res - res_H}{res} \quad \text{[Math. 11]}$$

Here, delay is a switching delay, $res_H$ is the resolution of the high image quality region, res is the resolution of the entire video, and $d_1$ to $d_4$ are coefficients determined in advance.

The video quality estimation unit 13 may calculate $D_{HL}$ using the following equation.

$$D_{HL} = \frac{D_H - D_L}{1 + (d_5 \cdot delay + d_6)^{d_7} \cdot (d_8 \cdot S_L + d_9)^{d_{10}}} + D_L \quad \text{[Math. 12]}$$

Here, $d_5$ to $d_{10}$ are coefficients determined in advance.

Effects of Embodiments

As described above, for tile-based VR video services, the video quality of the high image quality region and the video quality of the low image quality region are calculated and considered together with the parameters related to a time required to switch from the low image quality display state to the high image quality display state, so that it is possible to estimate experience quality for viewing which takes into account a deterioration in quality associated with the movement of the line of sight.

Conclusion of Embodiments

The present specification describes at least a video quality estimation device, a video quality estimation method, and a program described in each of the following clauses.

Clause 1

A video quality estimation device for estimating quality to be experienced by a user during viewing of a video, the device including:

a video quality estimation unit configured to calculate a video quality estimation value based on a parameter related to video quality of a high image quality region in the video, a parameter related to video quality of a low image quality region in the video, and a parameter related to a time for switching from a low image quality display state to a high image quality display state.

Clause 2

The video quality estimation device according to Clause 1, further including:

a high image quality region video quality estimation unit configured to estimate the video quality of the high image quality region based on the parameter related to the video quality of the high image quality region; and a low image quality region video quality estimation unit configured to estimate the video quality of the low image quality region based on the parameter related to the video quality of the low image quality region, wherein the video quality estimation unit calculates the video quality estimation value based on a high image quality region video quality estimation value estimated by the high image quality region video quality estimation unit, a low image quality region video quality estimation value estimated by the low image quality region video quality estimation unit, and the parameter related to the time for switching from the low image quality display state to the high image quality display state.

Clause 3

The video quality estimation device according to Clause 1 or 2, further including: an audio quality estimation unit configured to estimate audio quality in the video from a parameter related to the audio quality;

an audiovisual quality/quality variation integration unit configured to estimate audiovisual quality based on the video quality estimation value estimated by the video quality estimation unit and the audio quality estimation value estimated by the audio quality estimation unit;

a deterioration amount estimation unit configured to estimate an amount of deterioration of experience quality caused by playback stalling of the video based on a parameter related to the playback stalling; and a quality integration unit configured to estimate experience quality for viewing based on the audiovisual quality estimated by the audiovisual quality/quality variation integration unit and the amount of deterioration caused by the playback stalling estimated by the deterioration amount estimation unit.

Clause 4

The video quality estimation device according to Clause 3, wherein the audiovisual quality/quality variation integration unit estimates short-time audiovisual quality for short-time viewing based on the video quality estimation value estimated by the video quality estimation unit, and estimates the audiovisual quality based on the short-time audiovisual quality.

Clause 5

The video quality estimation device according to any one of Clauses 1 to 4, wherein the video viewed by the user is a tile-based VR video.

Clause 6

A video quality estimation method executed by a video quality estimation device for estimating quality to be experienced by a user during viewing of a video, the method including:

calculating a video quality estimation value based on a parameter related to video quality of a high image quality region in the video, a parameter related to video quality of a low image quality region in the video, and a parameter related to a time for switching from a low image quality display state to a high image quality display state.

Clause 7

A program for causing a computer to operate as each unit of the video quality estimation device according to any one of Clauses 1 to 5.

Although the present embodiment has been described above, the present disclosure is not limited to such specific embodiments, and can be modified and changed variously without departing from the scope of the present disclosure described in the appended claims.

REFERENCE SIGNS LIST

1 VR video quality estimation device
11 High image quality region video quality estimation unit
12 Low image quality region video quality estimation unit
13 Video quality estimation unit
14 Audio quality estimation unit
21 AV quality/quality variation integration unit
22 Unit for estimating an amount of deterioration caused by playback stalling
23 Quality integration unit
1000 Drive device
1001 Recording medium
1002 Auxiliary storage device
1003 Memory device
1004 CPU
1005 Interface device
1006 Display device
1007 Input device

The invention claimed is:

1. A video quality estimation device for estimating quality to be experienced by a user during viewing of a video, the device comprising one or more processors configured to perform operations comprising:

calculating a video quality estimation value based on (i) a parameter related to video quality of a high image quality region in the video, (ii) a parameter related to video quality of a low image quality region in the video, and (iii) a parameter related to a time for switching from a low image quality display state to a high image quality display state;

estimating audio quality in the video from a parameter related to the audio quality;

estimating audiovisual quality based on the video quality estimation value and the audio quality estimation value;

estimating an amount of deterioration of experience quality caused by playback stalling of the video based on a parameter related to the playback stalling; and estimating experience quality for viewing based on the audiovisual quality and the amount of deterioration caused by the playback stalling.

2. The video quality estimation device according to claim 1, further comprising:

a high image quality region video quality estimation unit, including one or more processors, configured to estimate the video quality of the high image quality region based on the parameter related to the video quality of the high image quality region; and a low image quality region video quality estimation unit, including one or more processors, configured to estimate the video quality of the low image quality region based on the parameter related to the video quality of the low image quality region, wherein the video quality estimation unit is configured to calculate the video quality estimation value based on a high image quality region video quality estimation value estimated by the high image quality region video quality estimation unit, a low image quality region video quality estimation value estimated by the low image quality region video quality estimation unit, and the parameter related to the time for switching from the low image quality display state to the high image quality display state.

3. The video quality estimation device according to claim 1, wherein the operations comprise:
  estimating short-time audiovisual quality for short-time viewing based on the video quality estimation value, and estimating the audiovisual quality based on the short-time audiovisual quality.

4. The video quality estimation device according to claim 1, wherein
  the video viewed by the user is a tile-based virtual reality video.

5. A video quality estimation method executed by a video quality estimation device for estimating quality to be experienced by a user during viewing of a video, the method comprising:
  calculating a video quality estimation value based on (i) a parameter related to video quality of a high image quality region in the video, (ii) a parameter related to video quality of a low image quality region in the video, and (iii) a parameter related to a time for switching from a low image quality display state to a high image quality display state;
  estimating audio quality in the video from a parameter related to the audio quality;
  estimating audiovisual quality based on the video quality estimation value and the audio quality estimation value;
  estimating an amount of deterioration of experience quality caused by playback stalling of the video based on a parameter related to the playback stalling; and
  estimating experience quality for viewing based on the audiovisual quality and the amount of deterioration caused by the playback stalling.

6. The video quality estimation method according to claim 5, further comprising:
  estimating the video quality of the high image quality region based on the parameter related to the video quality of the high image quality region; and
  estimating the video quality of the low image quality region based on the parameter related to the video quality of the low image quality region; and
  calculating the video quality estimation value based on a high image quality region video quality estimation value, a low image quality region video quality estimation value, and the parameter related to the time for switching from the low image quality display state to the high image quality display state.

7. The video quality estimation method according to claim 5, comprising:
  estimating short-time audiovisual quality for short-time viewing based on the video quality estimation value, and estimate the audiovisual quality based on the short-time audiovisual quality.

8. The video quality estimation method according to claim 5, wherein
  the video viewed by the user is a tile-based virtual reality video.

9. A non-transitory computer readable medium storing one or more instructions causing a computer to operate as a video quality estimation device to execute:
  calculating a video quality estimation value based on (i) a parameter related to video quality of a high image quality region in the video, (ii) a parameter related to video quality of a low image quality region in the video, and (iii) a parameter related to a time for switching from a low image quality display state to a high image quality display state;
  estimating audio quality in the video from a parameter related to the audio quality;
  estimating audiovisual quality based on the video quality estimation value and the audio quality estimation value;
  estimating an amount of deterioration of experience quality caused by playback stalling of the video based on a parameter related to the playback stalling; and
  estimating experience quality for viewing based on the audiovisual quality and the amount of deterioration caused by the playback stalling.

10. The non-transitory computer readable medium according to claim 9, wherein the one or more instructions cause the computer to execute:
  estimating the video quality of the high image quality region based on the parameter related to the video quality of the high image quality region; and
  estimating the video quality of the low image quality region based on the parameter related to the video quality of the low image quality region; and
  calculating the video quality estimation value based on a high image quality region video quality estimation value, a low image quality region video quality estimation value, and the parameter related to the time for switching from the low image quality display state to the high image quality display state.

11. The non-transitory computer readable medium according to claim 9, wherein the one or more instructions cause the computer to execute:
  estimating short-time audiovisual quality for short-time viewing based on the video quality estimation value, and estimate the audiovisual quality based on the short-time audiovisual quality.

12. The non-transitory computer readable medium according to claim 9, wherein
  the video viewed by a user is a tile-based virtual reality video.

* * * * *